United States Patent
Sumada et al.

(12)

(10) Patent No.: US 7,196,612 B2
(45) Date of Patent: Mar. 27, 2007

(54) SADDLE TYPE VEHICLE HAVING A REMOTE CONTROL TYPE TRUNK

(75) Inventors: Takashi Sumada, Saitama (JP); Yoshifumi Mochizuki, Saitama (JP); Koji Kano, Saitama (JP); Koichi Nozoe, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 308 days.

(21) Appl. No.: 09/820,915

(22) Filed: Mar. 30, 2001

(65) Prior Publication Data

US 2002/0027497 A1    Mar. 7, 2002

(30) Foreign Application Priority Data

Mar. 31, 2000    (JP)    ............................. 2000-098983

(51) Int. Cl.
*H04B 1/00*    (2006.01)

(52) U.S. Cl. ............... 340/5.72; 340/5.64; 340/426.13; 340/426.29; 340/427; 340/825.72; 340/825.69; 340/426.1; 296/37.1; 296/37.6; 296/76

(58) Field of Classification Search ............... 340/5.72, 340/427, 426.13, 426.29, 425.5, 825.72, 340/825.69, 426.1, 5.64; 70/64; 296/37.1, 296/37.6, 76; 180/219, 287
See application file for complete search history.

(56) References Cited

U.S. PATENT DOCUMENTS 3,908,168 A * 9/1975 McMahon ................. 455/11.1
4,788,542 A * 11/1988 Tanabe .................. 340/825.31
4,907,428 A    3/1990 Nakashima et al.
5,025,883 A * 6/1991 Morinaka et al. ........... 180/219
5,307,048 A * 4/1994 Sonders ...................... 340/426
6,030,018 A * 2/2000 Clare et al. ................ 296/37.6
6,351,242 B1 * 2/2002 Hesker ....................... 343/713
6,542,076 B1 * 4/2003 Joao ........................... 307/10.2

FOREIGN PATENT DOCUMENTS

| DE | 4102020 A1 | 8/1991 |
| DE | 4422906 A1 | 1/1996 |
| JP | A5938472 | 3/1984 |
| JP | 10-7053 A | 1/1989 |
| JP | Y233114 | 1/1991 |

\* cited by examiner

*Primary Examiner*—Brian Zimmerman
*Assistant Examiner*—Vernal Brown
(74) *Attorney, Agent, or Firm*—Birch, Stewart, Kolasch & Birch, LLP

(57) ABSTRACT

A saddle type vehicle including at least one trunk provided with a lid, an opening/closing mechanism for permitting and rejecting the opening and closing of the lid, and a radio signal receiving unit which receives a radio signal for remotely operating the opening/closing mechanism, whereby the radio signal receiving unit is disposed on top of the trunk. A rear trunk is mounted on a rear portion of a body of the vehicle, a lid having a projection formed outside on top of the trunk, and a radio signal receiving unit is disposed inside the projection.

18 Claims, 9 Drawing Sheets

FIG. 8

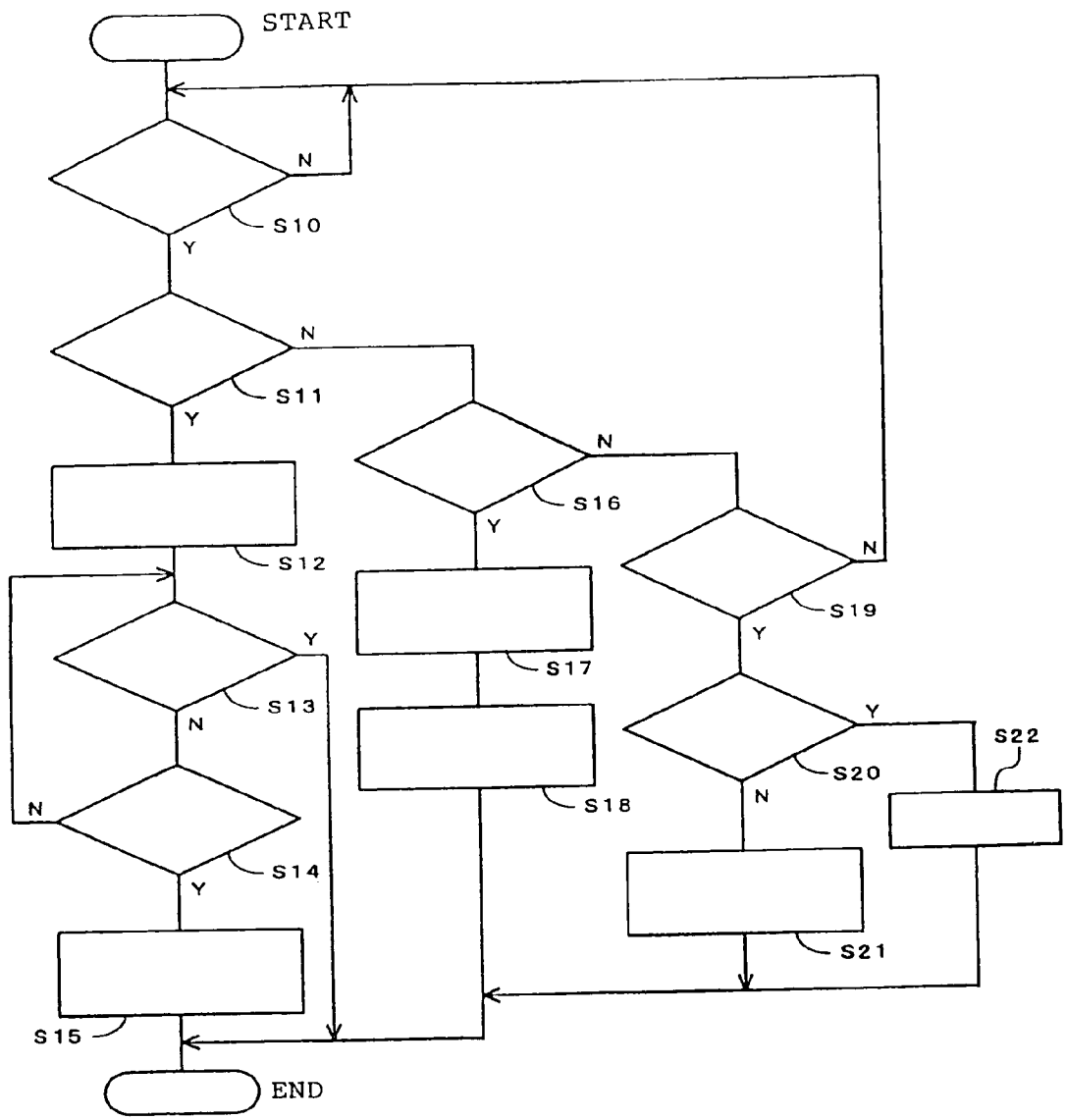

S10: Is radio signal transmitted?
S11: Unlocking signal?
S12: Unlocking command is issued to key actuator
S13: Has any one of trunks been opened?
S14: Has predetermined time elapsed?
S15: Locking command is issued to key actuator
S16: Pop-up signal?
S17: Pop-up command is issued to key actuator
S18: Pop-up command is issued to pop-up actuator
S19: Locking signal?
S20: Is any one of trunks left open?
S21: Locking command is issued to key actuator
S22: Hazard lamp is turned on and off ten times to warn

SADDLE TYPE VEHICLE HAVING A REMOTE CONTROL TYPE TRUNK

BACKGROUND OF THE INVENTION

1. Technical Field

The present invention relates to a saddle type vehicle provided with a remote control type trunk and particularly to a saddle type vehicle provided with a remote control type trunk capable of being remotely operated by radio.

2. Background Art

In such saddle type vehicles as two-wheeled motor vehicles, aquatic motorbikes (known as PWC: Personal Water Craft), and snowmobiles, the provision of plural trunks is effective for improving the storage capacity. In Japanese Utility Model Publication No. Hei 3-3114 filed by the applicant in the present case, there is proposed a two-wheeled motor vehicle wherein a rear trunk is mounted behind a seat and a pair of side trunks are mounted on right and left sides of a rear portion of the vehicle. Further, in Japanese Patent Laid-open No. Sho 59-38472 there is disclosed a technique for locking and unlocking a trunk of a four-wheeled motor vehicle by remote control.

If a remote control system which utilizes radio is to be adopted for locking and unlocking a trunk of a vehicle, it is necessary that a receiver for sensing a radio signal transmitted from a remote controller be mounted on the vehicle.

It is desirable that the receiver be disposed in a dead space on the vehicle. But if the receiver is spaced away from the trunk, the length of wiring connected to an actuator in the trunk becomes larger and the wiring is exposed to the exterior of the vehicle, thus resulting in impairment of appearance.

Further, in case of using an infrared ray in radio communication, it is necessary so that there is no obstacle between the remote controller and the receiver, no matter which position the remote controller may be operated at. Thus, it is desirable that the receiver be disposed at a high position of good visibility. In case of using a radio wave for radio communication, it is desirable that the receiver be spaced away from an engine in order to eliminate the influence of noise generated from the engine.

However, it has so far been difficult to dispose the receiver for a remote controller at an appropriate position on a vehicle so as to satisfy the aforesaid conditions without impairing the design of the vehicle and without formation of any unnecessary projection or the like.

It is an object of the present invention to solve the above-mentioned problems of the prior art and provide a saddle type vehicle having a remote control type trunk with a receiver of a remote controller mounted at an appropriate position without impairing the design of the vehicle and without formation of any unnecessary projection or the like.

SUMMARY OF THE INVENTION

According to the present invention, for achieving the above-mentioned object, there is provided a saddle type vehicle including at least one remote control type trunk provided with a lid, an opening/closing permitting/rejecting mechanism for permitting and rejecting opening and closing of the lid, and a radio signal receiving unit which receives a radio signal for remotely operating the opening/closing permitting/rejecting mechanism, characterized in that the radio signal receiving unit is disposed on top of the trunk.

According to the above characteristic of the invention, the radio signal receiving unit in a remote control system can be disposed in a dead space on the vehicle and at a position spaced away from an engine which is mounted near the trunk, without impairing the design of the vehicle and without formation of any unnecessary projection or the like.

In accordance with the present invention, it is a further object to provide the saddle type vehicle with a radio receiver disposed on top of a trunk, that is, at a high position, thereby the reception sensitivity is improved.

It is an additional object to provide a radio receiver disposed on top of a trunk, so that the wiring which connects a trunk locking/unlocking actuator and a sensor to the receiver is not required to be drawn out to the exterior of the vehicle, that is, the vehicle appearance is not impaired.

It is still another object to provide a radio receiver disposed on top of a trunk, so that there is no fear that the surface of a vehicle body may become uneven, nor is there any great reduction in trunk volume.

It is yet still another object to provide a projection formed on top of a trunk and a receiver disposed inside the projection, so that the reduction in trunk volume resulting from the provision of the receiver is kept to a minimum.

It is yet still another object to provide the projection formed on top of a trunk also serving as a back rest of a seat, so that the receiver accommodating portion can be utilized more effectively.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 8 is a flow chart showing operations of this embodiment;

DETAILED DESCRIPTION OF THE PREFERRED EMBODIMENTS

The present invention will be described in detail hereinunder with reference to the drawings.

Figure 1:
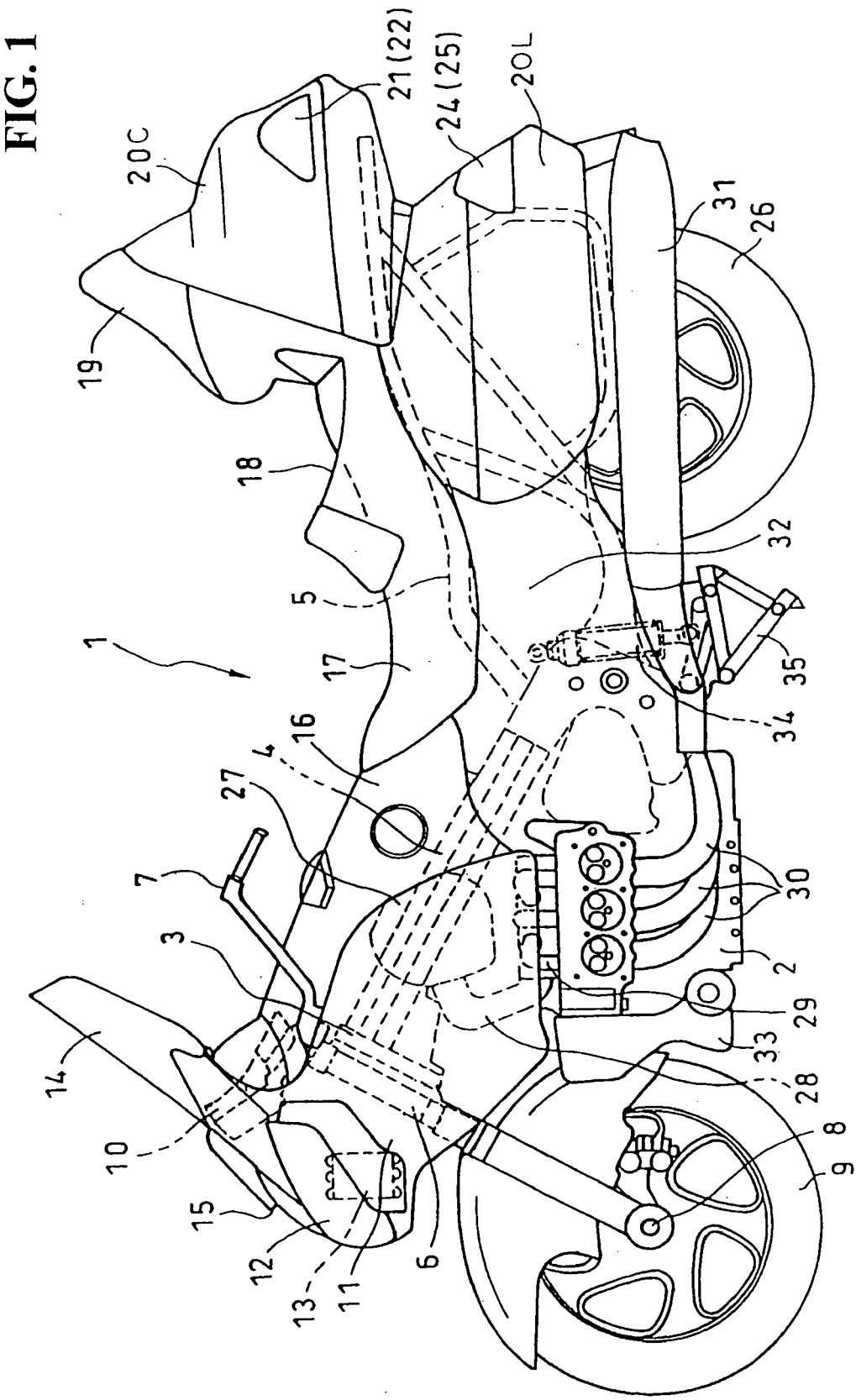
FIG. 1 is a side view of a two-wheeled motor vehicle with a remote control type vehicular trunk according to the present invention mounted thereon.

FIG. 1 is a side view of a two-wheeled motor vehicle on which a remote control type vehicular trunk embodying the invention is mounted.

A two-wheeled motor vehicle (hereinafter referred to as the "vehicle") 1 carries a six-cylinder engine 2 horizontally and a frame structure thereof is composed of a twin frame type main frame 4 extending in a bifurcated form backward of the vehicle from a steering head 3 and rear frames 5 connected to and extending backward from the main frame 4. In the steering head 3 is mounted a front fork 6 so as to be rotatable in steering directions, the front fork 6 comprising two pipes disposed right and left in a vehicular running direction. A bar handle 7 is fixed to the top of the front fork 6, that is, to a top bridge. A front axle 8 is secured to a lower end of the front fork 6 and a front wheel 9 is supported rotatably on the front axle 8.

A meter unit 10 is provided in front of the bar handle 7 and a lens surface (clear lens) 12 of a lamp device is mounted in front of a front fairing (cowl) 11 which covers a front portion of the vehicle 1. Inside the front cowl 11 is accommodated a voltage increasing device (ballast) 13 of an electric discharge lamp which is used as a lamp device. A windscreen 14 is mounted above the front cowl 11 and an air inlet 15 is formed near the mounted portion of the windscreen 14.

A fuel tank 16 is mounted on the main frame 4. Behind the fuel tank 16 and on the rear frames 5 are mounted a driver seat 17 and a fellow passenger seat 18. The fellow passenger seat 18 is integral with the driver seat 17 and has a back rest 19. Behind the back rest 19 is provided a rear trunk 20C which is locked and unlocked by means of a remote controller to be described later. In a rear portion of the rear trunk 20C are mounted rear stop lamps 21 and winker lamps 22.

Below the rear trunk 20C and on the left and right sides of a rear wheel 26 are provided side trunks 20L and 20R which are locked and unlocked by means of a remote controller as is the case with the rear trunk 20C. In rear portions of the side trunks 20L and 20R are provided another pair of rear stop lamps 24 and another pair of winker lamps 25.

An air cleaner 27 is mounted below and in front of the fuel tank 16 and a throttle body 28 is mounted in front of the air cleaner 27, with intake manifolds 29 extending from the throttle body 28. The three engine cylinders are disposed on the right and left sides of the vehicle body, and the three intake manifolds 29 are connected to the three cylinders. Upstream of each of the cylinders is disposed a fuel injector (not shown). Exhaust manifolds 30 are drawn out backward from the engine 2 and are connected to mufflers 31.

Both right and left sides below the driver seat 17 are covered with side covers 32 and a front lower cowl 33 is disposed in front of the engine 2. A rear cushion 34 is provided below the driver seat 17. The rear cushion 34 is connected to a hydraulic unit (not shown) which can adjust the spring force electrically and which thereby can adjust an initial suspension load in accordance with the weight of the driver. The vehicle 1 can be allowed to stand up with use of a stand 35.

Figure 2:
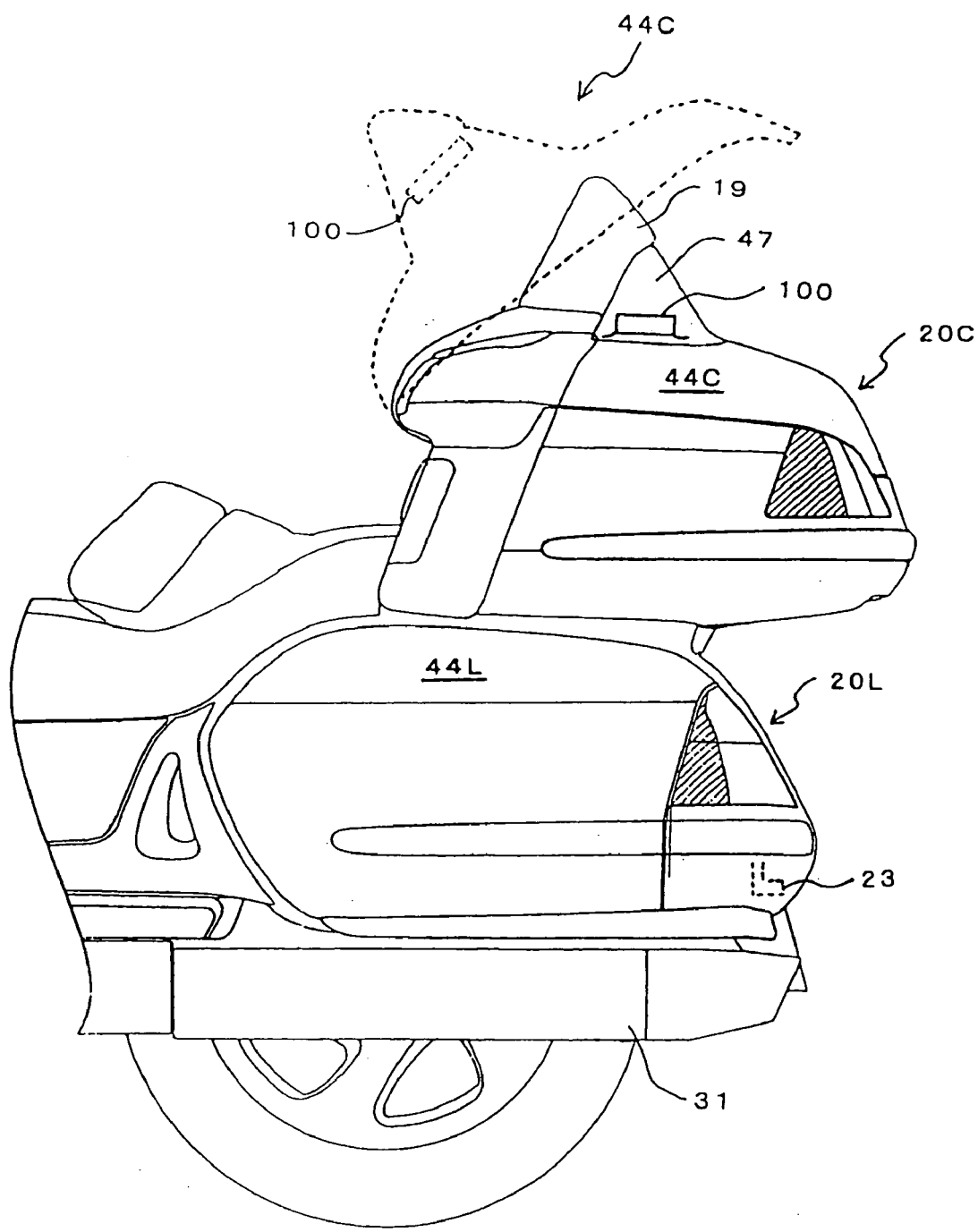
FIG. 2 is a detailed side view of a rear portion of the vehicle shown in FIG. 1.
Figure 3:
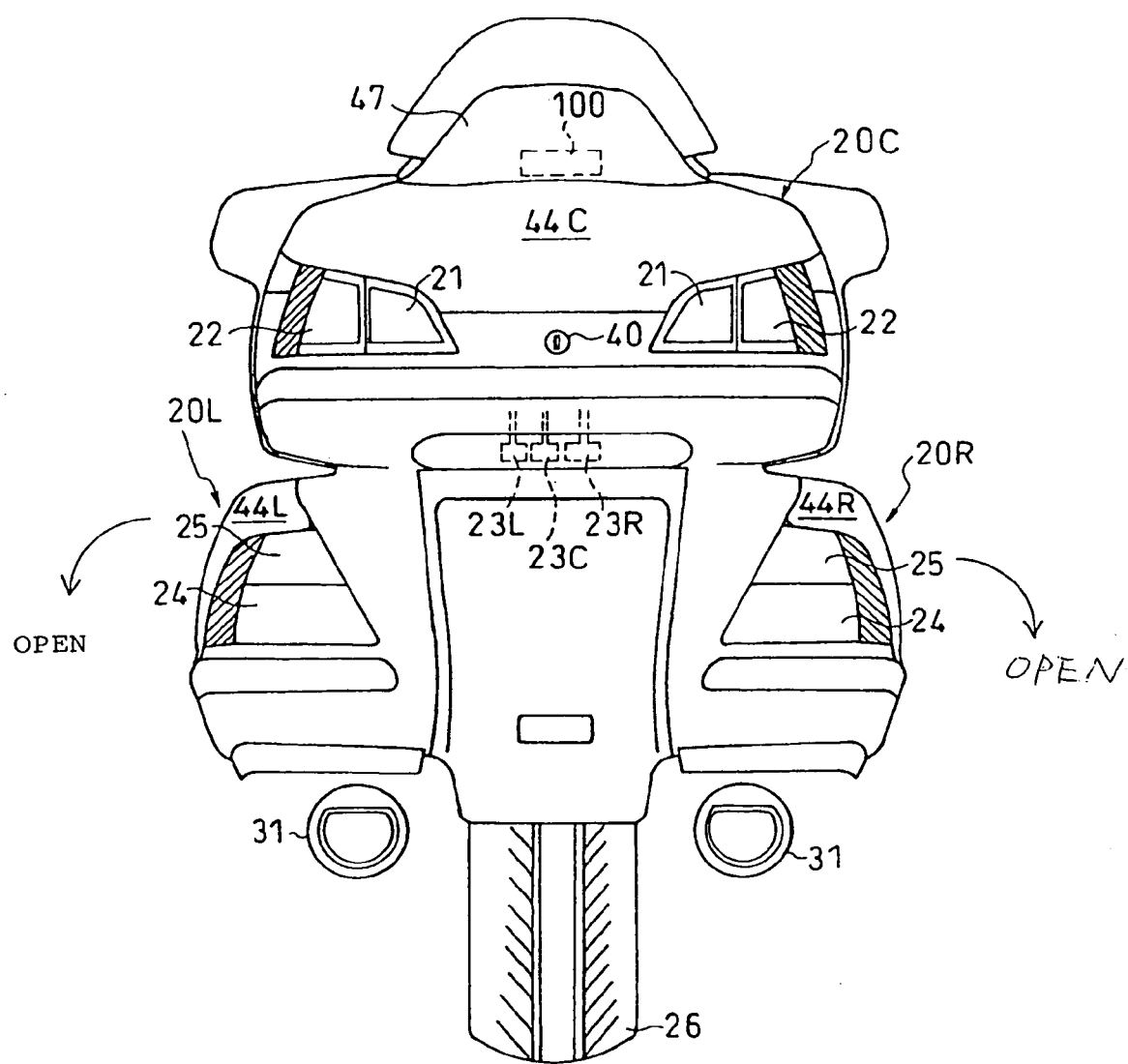
FIG. 3 is a rear view of the vehicle shown in FIG. 1.
Figure 4:
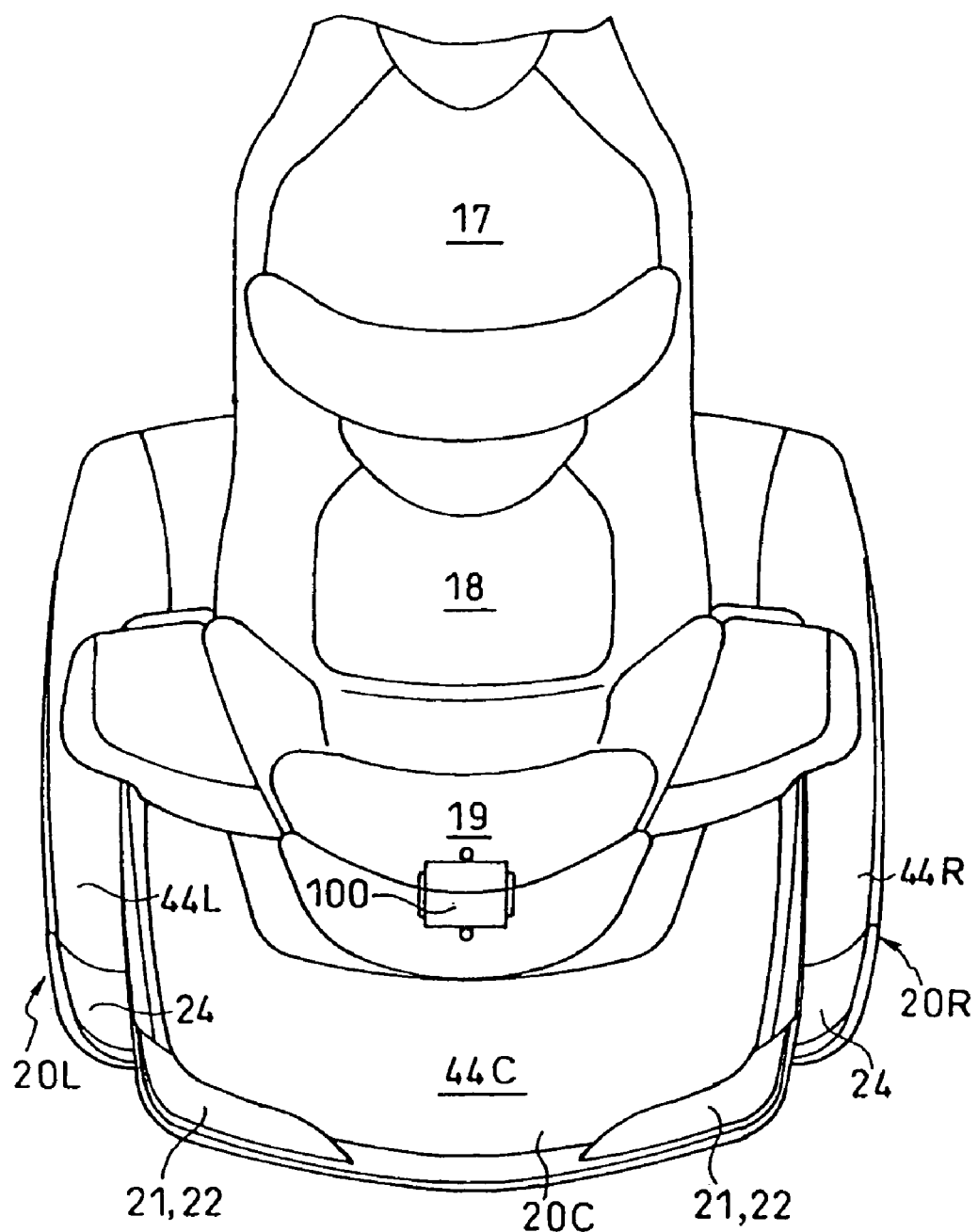
FIG. 4 is a diagram of the rear portion of the vehicle shown in FIG. 1 as seen from above.

FIG. 2 is a detailed side view of a rear portion of the vehicle 1 and the vicinity thereof, FIG. 3 is a rear view of the vehicle 1, and FIG. 4 is a view of the vehicle rear portion as seen from above. In these figure, the same reference numerals as in FIG. 1 represent the same or equivalent portions.

In the vehicle 1, as shown in FIG. 2, a lid 44C of the trunk 20C can open upward, while lids 44L and 44R of the side trunks 20L and 20R can open sideways. The trunks 20C, 20L, and 20R are locked and unlocked by inserting an engine key into a key cylinder 40 (see FIG. 3) provided in the trunk 20C and by turning the engine key. In this embodiment, locking and unlocking of the trunks 20C, 20L, and 20R can also be done by a radio type remote controller. A controller 100 having incorporated therein a radio signal receiving function, as well as an actuator for locking and unlocking and a sensor, are mounted on the vehicle.

It is preferable that the controller 100 be received in a dead space on the vehicle. But if the controller 100 is spaced away from the trunks, the length of wiring connected with an actuator of each trunk becomes larger and the wiring is exposed to the exterior of the vehicle, thus resulting in impairment of appearance.

In case of utilizing an infrared ray in the above radio communication, it is necessary to take care so that there is no obstacle between a remote controller and the controller 100 no matter which position the remote controller may be operated at. It is preferable that the controller 100 be disposed at a high position of good visibility. In case of utilizing a radio wave in the radio communication, it is desirable to dispose the controller 100 away from the engine in order to prevent the controller from being influenced by noise generated from the engine.

Where the rear trunk 20C mounted behind the fellow passenger seat 18 is relatively large-sized as in the vehicle of this embodiment, the rear trunk is formed high so that its front face serves also as the back rest 19 for a fellow passenger, as shown in FIG. 2.

In this case, from the standpoint of aerodynamics and design, a projection 47 having a projected upper surface is formed on top of the rear trunk 20C, that is, on the lid 44C. Consequently, a space of a low utility value, i.e., dead space, is formed in the interior of the rear trunk 20C and inside the projection 47. This space is located at a high position of good visibility and is spaced away from the engine 2.

In this embodiment, the controller 100 is disposed inside the projection 47 which is formed on top of the rear trunk 20C, more particularly, on the lid 44C.

As shown in FIG. 3, three opening/closing levers 23L, 23C, and 23R are provided in a lower portion of the rear trunk 20C. The lids 44L, 44C, and 44R of the side trunk 20L, rear trunk 20C, and side trunk 20R, respectively, are opened by operating the levers 23L, 23C, and 23R after unlocking made by the foregoing key operation or remote control.

In this embodiment, particularly as to the rear trunk 20C, as will be described in detail below, the lid 44C can be allowed to pop up simultaneously with unlocking even by the key operation or remote control without operating the opening/closing lever 23C.

Figure 5:
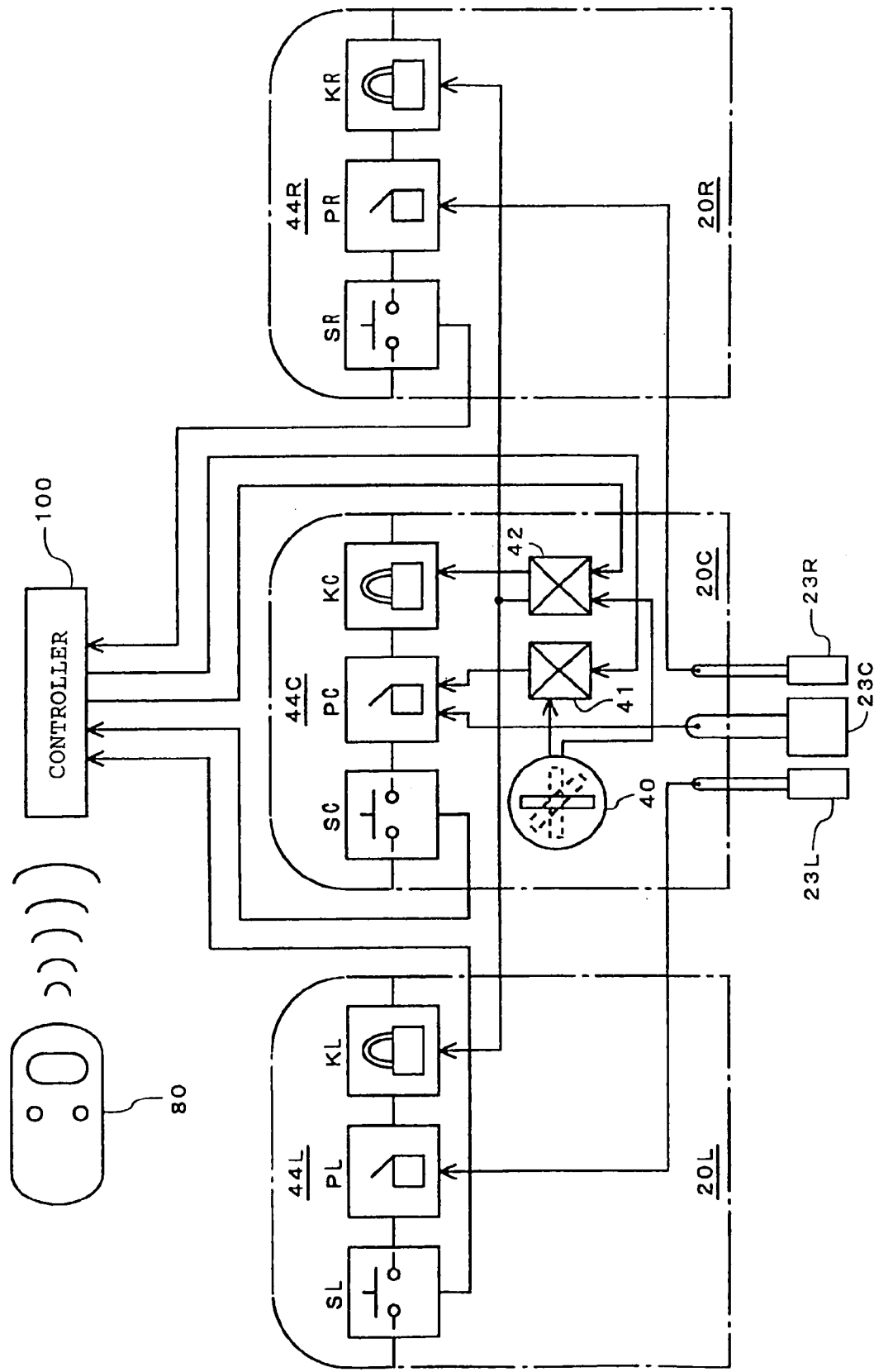
FIG. 5 is a functional block diagram of remote control type vehicular trunks.

FIG. 5 is a functional block diagram schematically showing the configuration of a system which locks, unlocks and pops up the lid 44 of each trunk 20 by remote radio operation using a remote controller 80, in which the same reference numerals as above represent the same or equivalent portions.

In the rear trunk 20C, a switch SC detects whether the lid 44C is open or closed and outputs the result of the detection to the controller 100. A lock mechanism KC is actuated by a key actuator 42 to lock or unlock the lid 44C. A trunk catcher PC is actuated by a pop-up actuator 41 to pop up the lid 44C simultaneously with unlocking. Further, only at the time of unlocking the trunk catcher PC is actuated by operation of the opening/closing lever 23C and opens the lid 44C. A key cylinder 40 locks or unlocks each trunk in response to a key operation and causes the lid 44C to pop up simultaneously with unlocking.

In the left and right side trunks 20L, 20R, switches SL and SR detect respectively whether the lids 44L and 44R are open or closed, and output the results of the detection to the controller 100. Lock mechanisms KL and KR are actuated by the key actuator 42 to lock the lids 44L and 44R respectively. Trunk catchers PL and PR are actuated by the opening/closing levers 23L and 23R to open the lids 44L and 44R.

The controller 100 detects a radio signal transmitted from the remote controller 80, and in response to signals transmitted from the switches S it controls the pop-up actuator 41 and the key actuator 42.

Figure 6:
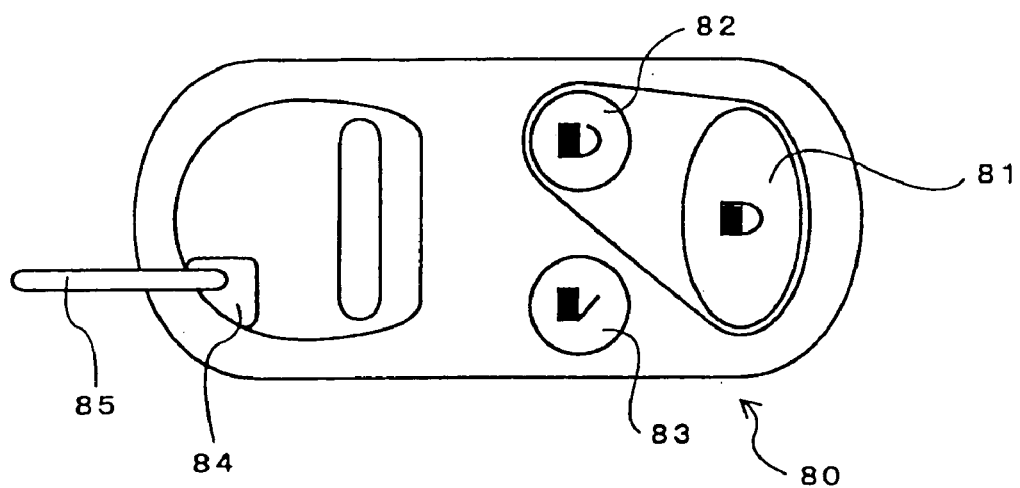
FIG. 6 is a plan view of a remote controller.
Figure 7:
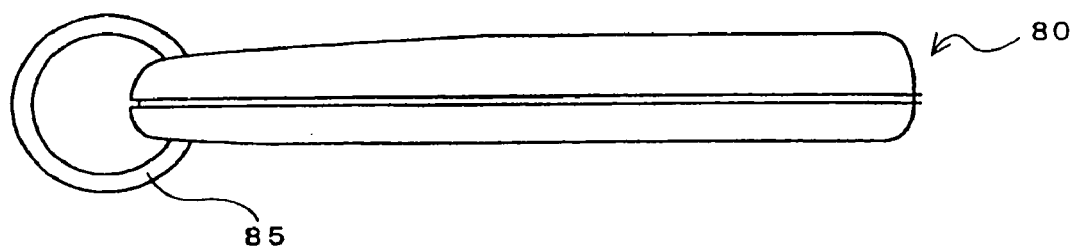
FIG. 7 is a side view of the remote controller.

FIG. 6 is a plan view of the remote controller 80 and FIG. 7 is a side view thereof. The remote controller 80 used in this embodiment is provided with a locking button 81 for locking all the trunks, an unlocking button 82 for unlocking all the trunks, and a pop-up button 83 for unlocking and popping-up only the rear trunk 20C selectively. An accessory ring 85 is fitted in a through hole 84 formed in an end portion of the remote controller 80.

When the locking button 81 is pushed, the remote controller 80 transmits a locking signal, while when the unlocking button 82 is pushed, the remote controller transmits an unlocking signal. Further, when the pop-up button 83 is pushed, the remote controller 80 transmits a pop-up signal.

Next, the operation of the controller 100 will be described below with reference to a flow chart of FIG. 8.

In step S10, a check is made to see whether a radio signal transmitted from the remote controller 80 has been received or not. If the answer is affirmative, the processing flow advances to step S11, in which it is judged whether the received signal is an unlocking signal or not. If the answer is affirmative, the flow advances to step S12, in which an unlocking command is issued from the controller 100 to the key actuator 42. Then, in response to the unlocking command the key actuator 42 unlocks all the lock mechanisms KC, KR, and KL.

In step S13, it is determined whether any lid 44 of the trunks has been opened or not, in accordance with output signals provided from the switches SC, SR, and SL mounted in the trunks. In step S14, a judgment is made as to whether the time during which none of the trunks 44 are opened exceeded a predetermined time or not. If the answer is affirmative, the flow advances to step S15, in which a locking command is issued from the controller 100 to the key actuator 42. In response to the locking command the key actuator 42 locks all the lock mechanisms KC, KR, and KL.

Thus, in this embodiment, even if all the trunks are unlocked in response to the unlocking command, if the time during which none of the trunks are opened exceeds a predetermined time, the trunks are locked automatically. Therefore, even in the event the trunks should be unlocked by an erroneous operation of the remote controller made by the driver, there is no fear of the trunks being left unlocked.

On the other hand, if it is judged in step S11 that the received signal is a signal other than unlocking signal, the flow shifts to step S16, in which a judgment is made as to whether the received signal is a pop-up signal or not. If the answer is affirmative, the flow advances to step S17, in which a pop-up command is issued from the controller 100 to the key actuator 42. In response to the pop-up command the key actuator 42 causes only the lock mechanism KC to be unlocked selectively.

Then, in step S18, a pop-up command is issued from the controller 100 to the pop-up actuator 41, which in turn actuates the pop-up mechanism PC of the trunk 20C in response to the pop-up command. As a result, the lid 44C of the trunk 20C is popped up by the pop-up mechanism PC.

Thus, in this embodiment, since unlocking and pop-up of the rear trunk 20C can be done by a single operation of the remote controller, so even when the driver carries goods in both hands or wears gloves, he or she can perform taking in and out of goods in a simple manner. Besides, since it is only the lid 44C of the rear trunk 20C that is popped up, it is not necessary to close again the lids 44L and 44R of the side trunks.

In this embodiment, moreover, since the above pop-up function is given to only the rear trunk 20C whose lid opens upward, the entry of rainwater can substantially be prevented even when the lid is opened by remote control in a rainy condition.

On the other hand, if it is judged in step S16 that the received signal is a signal other than pop-up signal, the flow shifts to step S19, in which a check is made to see whether the received signal is a locking signal or not. If the answer is affirmative, the flow advances to step S20, in which a judgment is made as to whether any lid 44 of the trunks is left open or not. If all the lids 44 are closed, then in step S21 a locking command is issued from the controller 100 to the key actuator 42, which in turn locks all the lock mechanisms KC, KR, and KL in response to the locking command. If any lid 44 is left open, the flow shifts to step S22, in which, for example a hazard lamp is turned on and off ten times or so to warn the driver.

In this embodiment, when the engine key inserted into the key cylinder 40 is turned 90° clockwise, an unlocking command is issued from the key cylinder 40 to the key actuator 42, which in turn unlocks all the lock mechanisms KC, KR, and KL.

When the engine key is turned 90° back from the unlocking position, a locking command is issued from the key cylinder 40 to the key actuator 42, which in turn locks all the lock mechanisms KC, KR, and KL in response to the locking command.

Further, when the engine key is turned counterclockwise from this lock position, a pop-up command is issued from the key cylinder 40 to both key actuator 42 and pop-up actuator 41. In response to this pop-up command the key actuator 42 unlocks only the lock mechanism KC in the trunk 20C selectively.

The pop-up actuator 41 actuates the pop-up mechanism PC of the trunk 20C in response to the pop-up command, causing the lid 44C to pop up.

Figure 9:
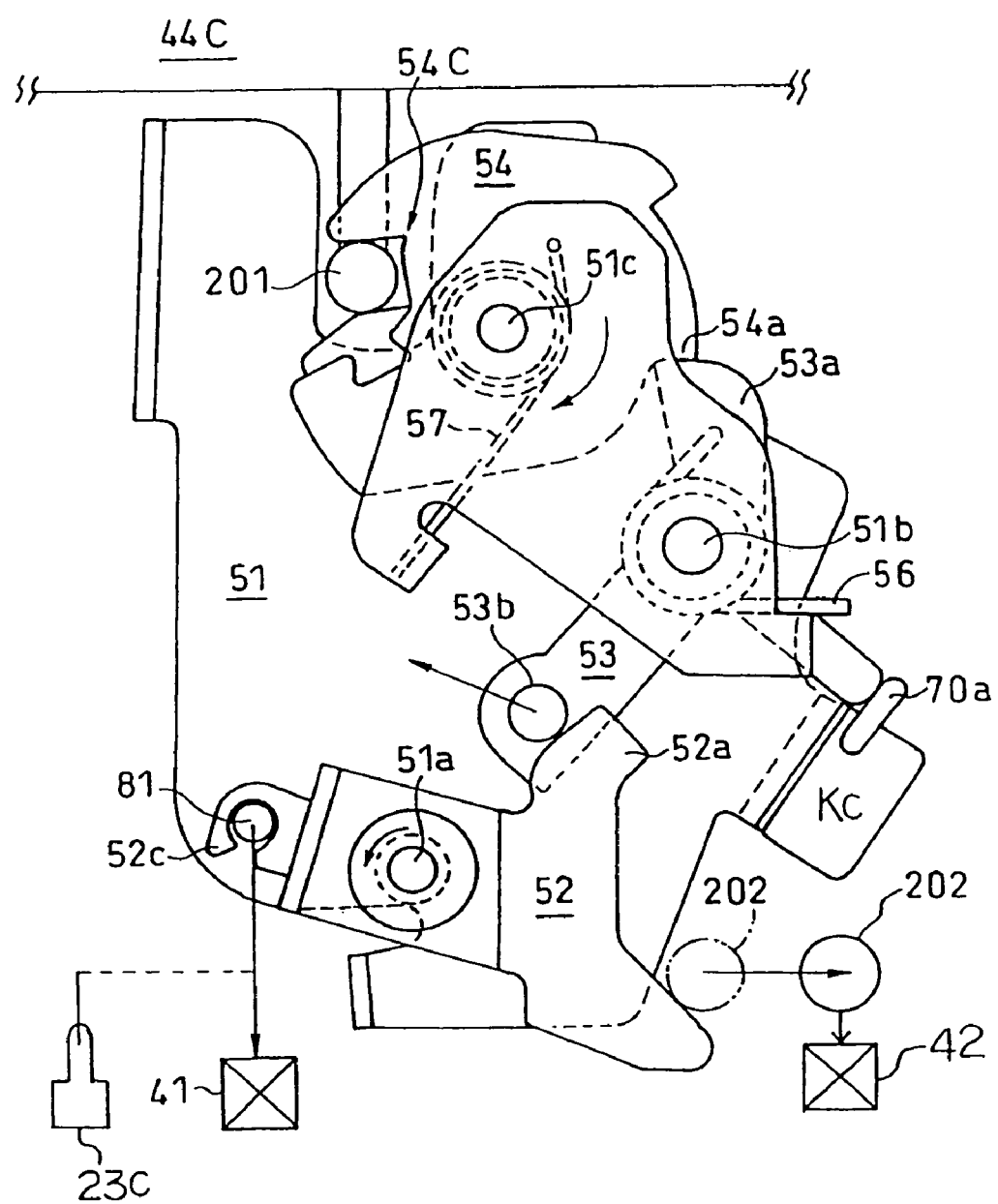
FIG. 9 illustrates a configuration of a trunk catcher (before pop-up state)
Figure 10:
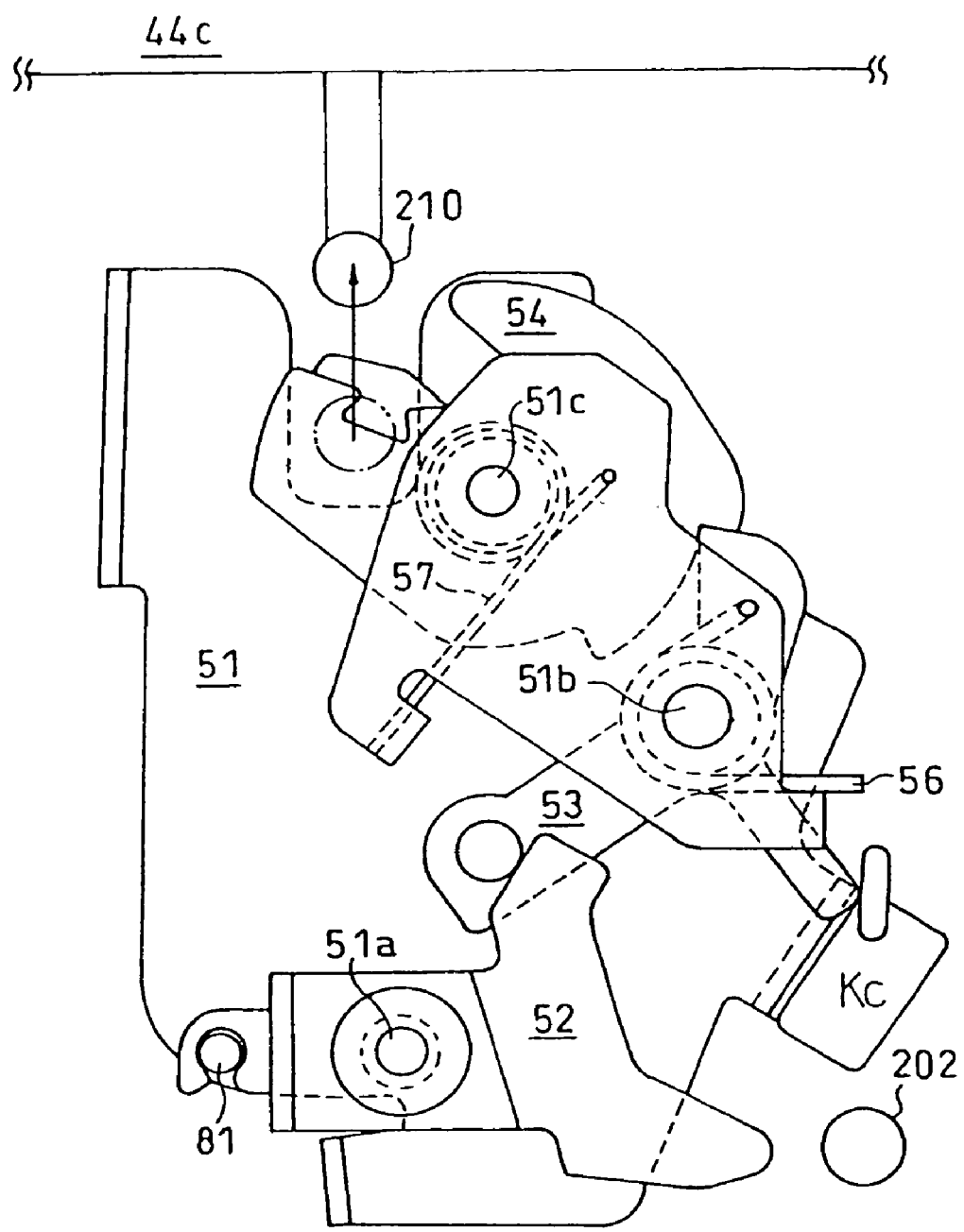
FIG. 10 illustrates a configuration of the trunk catcher (pop-up state).

FIGS. 9 and 10 illustrate a configuration of principal portions of the trunk catcher P mounted in each trunk for realizing the pop-up function, of which FIG. 9 illustrates a state before pop-up and FIG. 10 illustrates a pop-up state. Here, with the trunk catcher PC mounted in the rear trunk 20C as an example, its configuration and operation will be described.

Support shafts 51a, 51b, and 51c are erected on a base plate 51, and first, second, and third cam plates 52, 53, 54 are supported rotatably on the support shafts 51a, 51b, and 51c, respectively. The second cam plate 53 is constantly urged counterclockwise with the biasing force of a spring 56. The third cam plate 54 is constantly urged clockwise with the biasing force of a spring 57. On the basis of a rotational position of the second cam plate 53 the switch SC detects whether the lid 44C is open or closed.

According to such a configuration, in the state before pop-up illustrated in FIG. 9, an opening/closing pin 201 for the trunk lid 44C is positioned within a bifurcated portion 54c of the third cam plate 54. In the third cam plate 54, with the bifurcated portion 54c kept open leftward, a stopper arm 53a of the second cam plate 53 is engaged with a step 54a formed on an outer periphery of the third cam plate 54 to prevent the clockwise rotation of the third cam plate. Therefore, the opening/closing pin 201 is locked by the bifurcated portion 54c, whereby the lid 44C is kept closed.

A lock pin 202 as the lock mechanism KC is adapted to shift in the right and left directions in FIG. 9 in interlock with the key actuator 42. In a locked state the lock pin 202 assumes the position indicated with a broken line, while in an unlocked state it is moved up to the position indicated with a solid line. A pop-up rod 81 is engaged with a fulcrum portion 52c of the first cam plate 52. The pop-up rod 81 is adapted to shift vertically in the figure in interlock with both pop-up actuator 41 and opening/closing lever 23C.

When the opening/closing lever 23C is operated by the driver or the pop-up actuator 41 is operated by remote control using the remote controller 80, the pop-up rod 81 undergoes a downward force in the figure. At this time, if the lock pin 202 is in its unlock position indicated with a solid line, the first cam plate 52 turns counterclockwise about the support shaft 51a. On the other hand, if the lock pin 202 is in its lock position indicated with a broken line, the rotation of the first cam plate 52 is inhibited by the lock pin 202.

When the first cam plate 52 is turned counterclockwise, the pin 53b erected in the pivot point of the second cam plate 53 is pushed and shifted in the direction of an arrow by an operating portion 52a of the first cam plate 52. As a result, the second cam plate 53 turns clockwise about the support shaft 51b against the biasing force of the spring 56.

When the second cam plate 53 is turned, a contact lever 70a of the switch SC shifts and causes a contact thereof to be opened or closed. Further, the stopper arm 53a of the second cam plate 53 and the step 54a of the third cam plate 54 are disengaged from each other, so that the third cam plate 54 turns clockwise under the biasing force of the spring 57. As shown in FIG. 10, since the third cam plate 54 is turned until its bifurcated portion 54c faces upward, the pin 201 is released from the bifurcated portion 54c and the lid 44C is popped up.

In the case of trunk catchers PL and PR mounted in the side trunks 20L and 20R, their pop-up rods 81 are merely displaced by the opening/closing levers 23L and 23R, respectively, and are not connected to the pop-up actuator 41. In this embodiment, therefore, lids other than the lid 44C of the rear trunk 20C cannot be popped up by remote control using the remote controller 80 or by key operation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A remote control trunk assembly for a saddle type vehicle comprising:
   at least one trunk;
   at least one lid respectively mounted on each of said at least one trunk to move from an open position where the at least one lid is in contact with the at least one trunk to a closed position where the at least one lid is separated from the at least one trunk;
   an opening mechanism for opening each of said at least one lid to separate each of the at least one lid from the at least one trunk, respectively; and
   a radio signal receiving unit, said radio signal receiving unit receiving a radio signal for remotely operating said opening mechanism, said radio signal receiving unit being disposed on top of said at least one lid,
   wherein said remote control trunk assembly is mountable on a rear portion of a vehicle body, said at least one lid has a projection upwardly formed on a top surface thereof, said radio signal receiving unit is disposed inside said projection on said at least one lid and is disposed higher than the top surface of said at least one lid, and said projection is disposed at substantially a central portion of said at least one lid, and
   wherein said remote control trunk assembly is mountable on the rear portion of the vehicle body behind a seat, and said projection formed on top of said at least one lid is immediately adjacent a back rest of the seat.

2. The trunk assembly according to claim 1, further comprising a rear trunk and a pair of side trunks.

3. The trunk assembly according to claim 2 further comprising an opening lever for each of said at least one lid, each of said opening levers being provided in a lower portion of said rear trunk.

4. The trunk assembly according to claim 1, and further comprising:
   a switch for detecting whether said at least one lid is open or closed, said switch outputting a result of the detection to the radio signal receiving unit;
   a lock mechanism actuated by a key actuator to lock or unlock said at least one lid; and
   a trunk catcher actuated by a pop-up actuator to pop up said at least one lid simultaneously with unlocking said at least one lid.

5. The trunk assembly according to claim 4, wherein said radio signal receiving unit responds to signals transmitted from the switch to control the pop-up actuator and the key actuator.

6. A remote controller for a remote control trunk assembly, the trunk assembly including at least one lid, an opening mechanism for opening each of the at least one lid, a locking/unlocking mechanism and a radio signal receiving unit which receives a radio signal for remotely operating the opening/closing mechanism and the locking/unlocking mechanism, whereby the radio signal receiving unit is disposed on top of the at least one lid, said remote controller comprising:
   a locking button for sending a radio signal to the radio signal receiving unit to lock the at least one trunk with the locking/unlocking mechanism;
   an unlocking button for sending a radio signal to the radio signal receiving unit to unlock the at least one trunk; and
   an opening button for sending a radio signal to the radio signal receiving unit to unlock the at least one trunk and open the at least one lid;
   wherein said radio signal receiving unit is mountable on a rear portion of a vehicle body, the at least one lid has a projection upwardly formed on a top surface thereof, the radio signal receiving unit is disposed inside said projection on the at least one lid at substantially a central portion of the at least one lid, and the radio signal receiving unit is disposed higher than the top surface of said at least one lid, and
   wherein said remote control trunk assembly is mountable on the rear portion of the vehicle body behind a seat, and said projection formed on top of said at least one lid is immediately adjacent a back rest of the seat.

7. The remote controller according to claim 6, and further comprising a radio signal, said radio signal transmitting to the radio signal receiving unit having a switch to control a pop-up actuator and a key actuator.

8. The remote controller according to claim 6, wherein the at least one trunk includes a rear trunk and a pair of side trunks, and the locking button sends a signal to the radio signal receiving unit to lock all of the trunks, the unlocking button sends a signal to the radio signal receiving unit to unlock all of the trunks and the opening button sends a signal to the radio signal receiving unit to unlock and open only the rear trunk.

9. The trunk assembly according to claim 1, further comprising a locking/unlocking device for each of the at least one trunk, said locking/unlocking device causing each of said at least one trunk to be in a locked position where the at least one lid cannot be opened by the opening mechanism to an unlocked position where the at least one lid can be opened by the opening mechanism.

10. The trunk assembly according to claim 1, wherein said opening mechanism includes an opening lever and a trunk catcher, said opening lever being controlled in response to an opening signal received from the radio signal receiving unit to actuate the trunk catcher to open the at least one lid.

11. The trunk assembly according to claim 10, further comprising a locking/unlocking device for each of the at least one trunk, said locking/unlocking device causing each of said at least one trunk to be in a locked position where the at least one lid cannot be opened by the opening mechanism to an unlocked position where the at least one lid can be opened by the opening mechanism.

12. The trunk assembly according to claim 9, wherein the locking/unlocking device includes a key actuator and a lock mechanism, said key actuator being controlled in response to a locking or unlocking signal received from the radio signal receiving unit to actuate the lock mechanism to lock or unlock the at least one lid.

13. The trunk assembly according to claim 11, wherein the locking/unlocking device includes a key actuator and a lock mechanism, said key actuator being controlled in response to a locking or unlocking signal received from the radio signal receiving unit to actuate the lock mechanism to lock or unlock the at least one lid.

14. The trunk assembly according to claim 11, further comprising a remote controller, said remote controller including a locking button for sending a radio signal to the radio signal receiving unit to lock the at least one trunk, an unlocking button for sending a radio signal to the radio signal receiving unit to unlock the at least one trunk and an opening button for sending a radio signal to the radio signal receiving unit to unlock the at least one trunk and open the at least one lid.

15. The trunk assembly according to claim 13, further comprising a remote controller, said remote controller including a locking button for sending a radio signal to the radio signal receiving unit to lock the at least one trunk, an unlocking button for sending a radio signal to the radio signal receiving unit to unlock the at least one trunk and an opening button for sending a radio signal to the radio signal receiving unit to unlock the at least one trunk and open the at least one lid.

16. The trunk assembly according to claim 14, wherein the at least one trunk includes a rear trunk and a pair of side trunks, and the locking button sends a signal to the radio signal receiving unit to lock all of the trunks, the unlocking button sends a signal to the radio signal receiving unit to unlock all of the trunks and the opening button sends a signal to the radio signal receiving unit to unlock and open only the rear trunk.

17. The trunk assembly according to claim 15, wherein the at least one trunk includes a rear trunk and a pair of side trunks, and the locking button sends a signal to the radio signal receiving unit to lock all of the trunks, the unlocking button sends a signal to the radio signal receiving unit to unlock all of the trunks and the opening button sends a signal to the radio signal receiving unit to unlock and open only the rear trunk.

18. A remote controller for a remote control trunk assembly, the trunk assembly including at least one trunk, at least one lid respectively mounted on each of said at least one trunk to move from an open position where the at least one lid is in contact with the at least one trunk to a closed position where the at least one lid is separated from the at least one trunk, an opening mechanism for opening each of the at least one lid to separate each of the at least one lid from the at least one trunk, a locking/unlocking device for each of the at least one trunk, said locking/unlocking device causing each of said at least one trunk to be in a locked position where the at least one lid cannot be opened by the opening mechanism to an unlocked position where the at least one lid can be opened by the opening mechanism and a radio signal receiving unit which receives a radio signal for remotely operating the opening/closing mechanism and the locking/unlocking device, whereby the radio signal receiving unit is disposed on top of the at least one lid, said remote controller comprising:

a locking button for sending a radio signal to the radio signal receiving unit to lock the at least one trunk;

an unlocking button for sending a radio signal to the radio signal receiving unit to unlock the at least one trunk; and an opening button for sending a radio signal to the radio signal receiving unit to unlock the at least one trunk and open the at least one lid;

wherein said radio signal receiving unit is mountable on a rear portion of a vehicle body, the at least one lid has a projection upwardly formed on a top surface thereof, the radio signal receiving unit is disposed inside said projection on the at least one lid at substantially a central portion of the at least one lid, and the radio signal receiving unit is disposed higher than the top surface of said at least one lid, and wherein said remote control trunk assembly is mountable on the rear portion of the vehicle body behind a seat, and said projection formed on top of said at least one lid is immediately adjacent a back rest of the seat.

* * * * *